July 1, 1947.　　　L. A. DE ROSA　　　2,423,085
DELAY DEVICE
Original Filed March 5, 1943
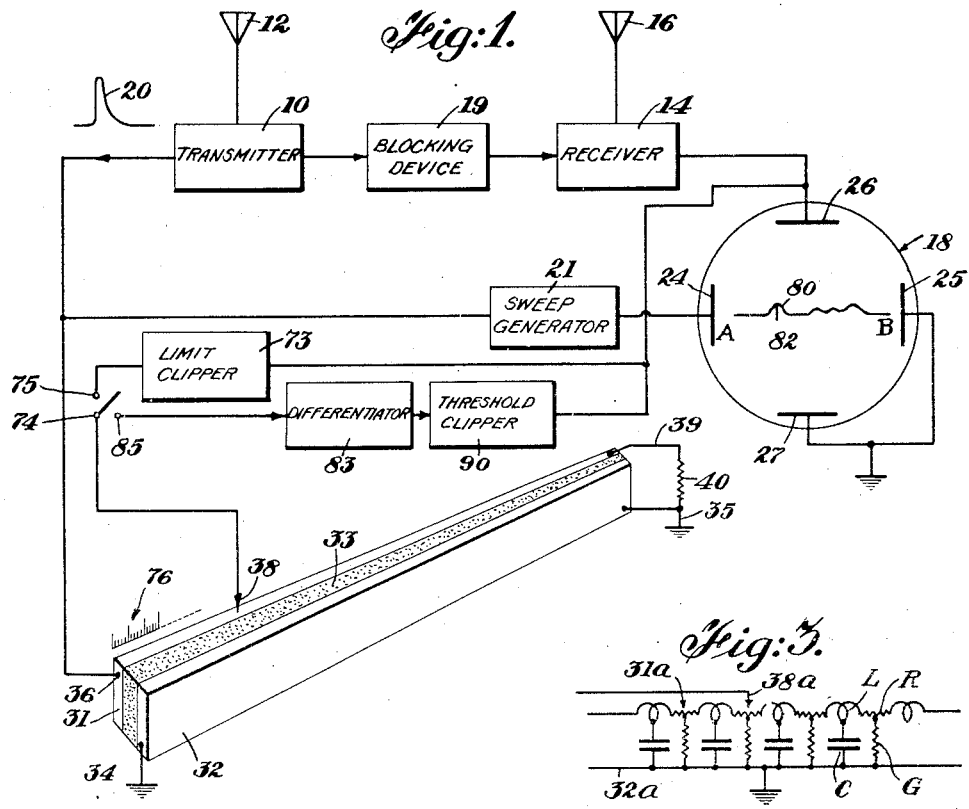
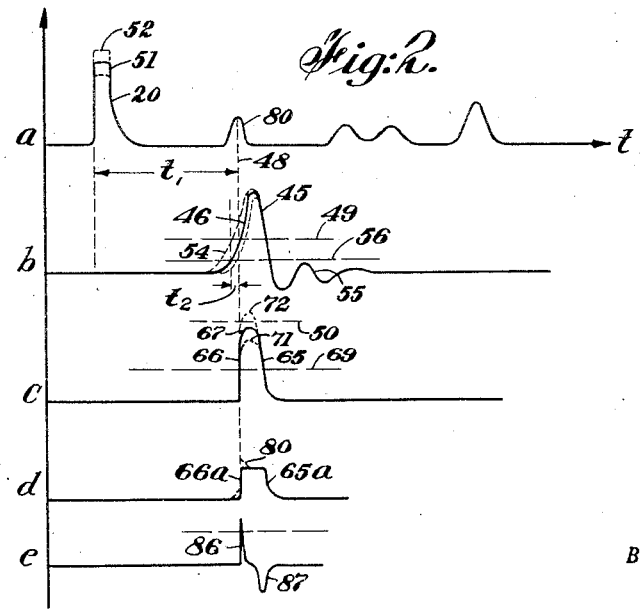
INVENTOR.
LOUIS A. DE ROSA
BY *Percy P. Lantzy*
ATTORNEY Patented July 1, 1947

2,423,085

UNITED STATES PATENT OFFICE 2,423,085

DELAY DEVICE

Louis A. de Rosa, West Brighton, Staten Island, N. Y., assignor to Federal Telephone and Radio Corporation, New York, N. Y., a corporation of Delaware Original application March 5, 1943, Serial No. 478,080. Divided and this application March 13, 1944, Serial No. 526,169

4 Claims. (Cl. 178—44)

This invention relates to delay devices for use in electrical circuits.

This application is a division of my copending application, Serial No. 478,080, filed March 5, 1943.

It has been proposed heretofore to use adjustable delay devices of artificial line construction for measuring, by controlling the retardation of a reference pulse, the interval of time occurring between the transmission of an impulse and the reception of an echo pulse caused by a craft or other obstacle in response to the impulse. These proposed artificial lines, however, so alter the shape of the reference pulse as to introduce error into the time measurement unless considerable precaution is taken to maintain the input energy of the reference pulse at a given amplitude and by using pulse reshapers and other shape compensating means at the output of the line.

It is an object of my invention to provide a delay device capable of giving for different degrees of retardation an output wave-front substantially identical for at least a substantial part to the wave-front of the input energy.

The above and other objects of my invention will become more apparent upon consideration of the following detailed description to be read in connection with the accompanying drawings, in which:

Fig. 1 is a schematic block diagram of a radio detection system incorporating a delay device according to my invention;

Fig. 2 is a graphical illustration of the operation and advantgaes of a delay device constructed according to my invention;

Fig. 3 is a schematic wiring diagram of an additional embodiment of the invention; and Fig. 4 is a graphical illustration of the effect obtained in the embodiment shown in Fig. 3.

Referring to Fig. 1 of the drawings, the radio detection system therein illustrated includes a transmitter 10 and an antenna 12 for transmission of recurring impulses. A receiver 14 and an antenna 16 together with a cathode ray oscillograph 18 are provided to receive and indicate echo pulses caused by obstacles, in response to the transmitted impulses. Connecting the transmitter to the receiver is the usual blocking circuit 19 arranged to momentarily block the receiver during the transmission of impulses. The oscillograph 18 is arranged for panoramic indication of echo pulses detected over a range of 200 miles more or less. The oscillograph 18 or an additional oscillograph may be arranged if desired to cover a shorter range or a selected portion of the maximum effective range.

The sweep line A—B of the oscillograph 18 is controlled by the transmission of the impulses from transmitter 10 by means of synchronizing pulse energy 20 the leading edge of which corresponds in time with the leading edge of the transmitted impulses. The synchronizing pulses 20 are applied to a sweep generator 21 which is adjusted to provide a desired sweep potential such as obtainable from a saw-tooth generator. The sweep potential thus generated is applied to horizontally disposed deflection plates 24 and 25 thereby producing the sweep line A—B. The output of the receiver is applied to the vertically disposed deflection plates 26 and 27 so as to deviate the sweep line according to echo pulses detected by the receiver.

These prior devices show various means for measuring the time interval between the transmission of an impulse and the reception of a corresponding echo pulse produced by an obstacle within the range of the system. As described herebelow, I provide a reference pulse producing means including an adjustable energy retarding device by which the time interval can be measured by adjusting the retardation of the reference pulse for coincidence with a particular echo pulse the time interval to which is desired. My system has a high degree of accuracy for this measurement because the wave-front of the synchronizing pulse 20 is, at least in part, unchanged at the output of the delay device even though the synchronizing pulse may be caused to vary in amplitude by extraneous noise effects.

The delay device according to my invention comprises two strips of conducting material 31 and 32 with a strip or layer of dielectric material 33 diposed between the two strips of conducting material. One of the strips such as 32 is grounded as indicated at 34 and 35 so that it provides a substantially even ground potential throughout the length thereof. The strip 31 has an input terminal 36 at one end thereof and an output member 38 adjustable along the length thereof to take off retarded energy according to the location of the member with respect to the input terminal 38. The end of the strip 31 opposite the input terminal end 36 is preferably grounded by a connection 39 through a resistor 40 having, preferably, a surge impedance equal to that of the delay device. Where the delay device extends a substantial length beyond the range of the movable member 38, the resistance 40 may be omitted.

The strips 31, 32 and 33 are preferably chosen so as to provide uniform attenuation and uniform leakage per unit length of line. Uniform attenuation is obtained by using material such as Permalloy having exceptionally high permeability similarly as in the case of the artificial line disclosed in my copending application, Serial No. 454,198, filed August 8, 1942, issued as Patent No. 2,362,470, November 14, 1944. The uniform leakage effected may be produced by using any one of several different dielectric mediums. One suitable dielectric may comprise an insulation paper wherein particles of graphite are evenly dispersed as a filler. Another dielectric that may be used comprises an insulating paper formed with finely powdered copper evenly dispersed therein. Other conducting particles and even particles of iron may be used. Where iron is included, it serves to increase the inductance of the line as well as leakage. This dielectric medium provides an unusually large evenly distributed leakage.

Curves b and c of Fig. 2 illustrate respectively, the retardation effects of a non-dissipating artificial line and an artificial line provided with substantial leakage distributed evenly along the length thereof. The pulse 45 represents the shape of energy retarded by a non-dissipating artificial line after a retardation of time $t_1$. It will be observed that the leading edge 46 is inclined with respect to the leading edge of the pulse 20. This leading edge 46 has a decided tail extending to the left of the demarcation line 48 of the time interval $t_1$. The practice heretofore has been to clip the pulse 45 at a level 49 and to differentiate and otherwise reshape the pulse so as to produce a reference indicator according to the occurrence of the wave-front 46. This introduces a difference in the time for the indicator occurrence with respect to the demarcation line 48 as the output contact is moved along the length of the line. For example, the inclination of the wave-front 46 becomes less sharp as the current wave travels further along the line, and sharper as the length of the line through which the energy flows is decreased. This variation introduces error for which it is difficult to compensate throughout the movement of the outlet contact 38.

Another place where error occurs in the use of an artificial line of existing constructions is the change in output pulse shape due to variations in the amplitude of the input pulse. For example, where the input pulse 20 varies between the limits 51 and 52 as indicated in curve a, the wave-front 46 will be caused to vary between the limits 53 and 54 as indicated in curve b. That is to say, the greater amplitude produces a faster output pulse build-up as indicated by the curve 54 while the lesser amplitude produces a slower pulse build-up. This variation in the occurrence of the wave-front introduces an error equal to plus or minus $t_2$, where $t_2$ is the difference in occurrence between the average amplitude value and one of the likely limits of variations. It might be added, by way of explanation, that the variation in amplitude of the pulse 20 may be caused by the occurrence of random noise voltage by various extraneous voltage sources.

It will also be observed that the pulse 45 has a trailing oscillation 55. To prevent the trailing oscillations from being introduced along the sweep line with the reference pulse, a threshold clipping operation along a level 56 or other oscillation eliminating arrangement is necessary.

In curve c of Fig. 2, I show a pulse 65 of the character obtained at the output terminal 38 of the delay device constructed in accordance with my invention. Due to the leakage feature of the dielectric medium interposed between the plates of strips 31 and 32, the output pulse 65 has a wave-front 66 which is for the major portion thereof substantially identical to the shape of the wave-front of the input pulse 20. As the wave-front 66 approaches the average amplitude 50 of the pulse 20, the leading edge slopes as indicated at 67. The trailing edge of the pulse 65 due to a strong damping action of the smooth line effect of the device is devoid of any trailing oscillations (see 55, curve b). Since the pulse 65 may be clipped at 69, the upper portion thereof including the tapered part 67 may be eliminated so that reshaping is not necessary. Furthermore, any variation in the amplitude of the input pulse 20 merely increases the amplitude of the pulse 65 as indicated by the limits 71 and 72 and therefore does not affect the slope of the leading edge 66.

Curve d of Fig. 2 shows the output pulse 65 after it has been clipped by passage through a limit clipper 73. This clipped pulse 65a may be applied directly across the deflection plates 26 and 27 by closing switch contacts 74 and 75. Since the delay device is provided with an appropriate calibration 76, the retardation of the leading edge 66a of the pulse will give a reference indication which corresponds to the position of the member 38 with respect to the calibrations 76. By adjusting the member 38 until the leading edge 66a is in coincidence with the center portion of an echo pulse 80, the calibration reading at the position of the member 38 will give the distance to the obstacle causing the echo pulse 80. The echo pulse 80 is shown in dotted lines in curve d in coincidence with the leading edge of the pulse 65a.

In case a single line reference indicator 82 is desired, the pulse 65 may be applied directly to a differentiator 83 by closing the contact 74 with the contact 85. This gives a narrow positive pulse 86 defining the leading edge 66 and a negative pulse 87 defining the reversal portion of the pulse 66 to the trailing edge thereof. The positive pulse 86 is clipped by passing the output of the differentiator through a threshold clipper 90. This produces the line indicator 82 which when applied across the deflecting plates 26 and 27 may be made to coincide with the echo pulse 80 substantially as shown in Fig. 1.

In Fig. 3, I show the principles of my invention in the form of an artificial line made up of lumped constants. The conductor 31a is made up of inductances L and resistances R and the dielectric medium is represented by distributed capacitance C and distributed leakage G between the line 31a and the ground line 32a. Such a line by proper distribution of the L, R, C and G elements provides for a substantially evenly distributed attenuation and leakage along the line approaching somewhat the smooth and even distribution of constants of the embodiment of Fig. 1. The high leakage even though lumped provides for the output pulse 65b (Fig. 4) a leading edge substantially identical to the leading edge of the pulse 65. The trailing edge, however, has some ripple 55b.

From the foregoing it will be clear that the delay device according to my invention produces a wave-front on the retarded energy which is, for the most part, the same as the wave-front of the input energy. This device when used in radio detection eliminates substantially the errors experienced heretofore in artificial lines due to variations in amplitude of the input pulse energy. It will also be observed that the delay device of my invention eliminates the precautions necessary in prior delay lines to compensate for variations in slope of the wave-front due to different degrees of retardation.

While I have shown the principles of my invention in connection with specific embodiments, it will be understood that many variations in the construction and arrangement of the parts thereof may be made without departing from the scope of the invention. For example, in place of making the delay line of straight strips as illustrated in Fig. 1, the strips may be arranged circularly or in the form of a spiral such as illustrated in my aforementioned copending application, Serial No. 454,198, issued as Patent No. 2,362,470, November 14, 1944. It will be understood, therefore, that the embodiments herein shown and described are given by way of example only and not as limiting the scope of the invention as set forth in the objects and the appended claims.

I claim:
1. A delay device comprising two strips of conducting material, a strip of dielectric material interposed between the strips of conducting material, means to ground one of the strips of conducting material, the other of said conducting strips having an input terminal and an output terminal spaced apart along the length thereof, and said dielectric strip having particles of conducting material substantially uniformly dispersed therethrough to provide distributed leakage between the strips of conducting material.

2. The delay line defined in claim 1 wherein the particles of conducting material dispersed through the dielectric strip comprises fine particles of graphite.

3. The delay line defined in claim 1 wherein the particles of conducting material dispersed through the dielectric strip comprises fine particles of copper.

4. The delay line defined in claim 1 wherein a terminating impedance simulating the surge impedance of the line is connected between the two strips at their end remote from the input terminal.

LOUIS A. DE ROSA.

REFERENCES CITED

The following references are of record in the file of this patent:

UNITED STATES PATENTS

| Number | Name | Date |
| --- | --- | --- |
| 2,228,798 | Wassermann | Jan. 14, 1941 |
| 2,250,461 | Batchelder | July 29, 1941 |
| 369,259 | Patterson | Aug. 30, 1887 |
| 1,658,740 | Rice | Feb. 7, 1928 |